United States Patent [19]

Kartiala

[11] Patent Number: 5,075,681

[45] Date of Patent: Dec. 24, 1991

[54] RADAR CROSS-SECTION MODEL SUPPORT AND POSITIONING APPARATUS

[75] Inventor: T. Tapio Kartiala, Granada Hills, Calif.

[73] Assignee: Lockheed Corporation, Calabasas, Calif.

[21] Appl. No.: 646,044

[22] Filed: Jan. 28, 1991

[51] Int. Cl.[5] ................................................. G01S 7/40
[52] U.S. Cl. ..................................... 342/165; 342/175
[58] Field of Search ............................ 342/175, 4, 165

[56] References Cited

U.S. PATENT DOCUMENTS

| | | | |
|---|---|---|---|
| 4,713,667 | 12/1987 | Poirier et al. | 342/192 |
| 4,947,175 | 8/1990 | Overholser | 342/165 |
| 4,990,923 | 2/1991 | Delfeld | 342/165 |

Primary Examiner—John B. Sotomayor
Attorney, Agent, or Firm—Louis L. Dachs

[57] ABSTRACT

The invention is an apparatus for supporting a model above a ground plane for illumination by a radar signal in order to determine the RCS thereof. The apparatus includes a plurality of support towers in a spaced relationship extending vertically upward from the ground plane. An upper suspension system is provided that comprises a separate cable attached at one end to an individual tower and attachable at the opposite end to the model at a single point on the upper surface thereof so that the model can be simultaneously rotated about the yaw axis and pitch axis. A circular shaped track aligned with the direction of the radar signal is mounted below the ground plane having a center of the radius at the point that the cables of the upper suspension system attach to the model. A platform is movably mounted on the track and thus, moveable with a circular motion about the point that the cables attach to the model. The platform incorporates a drive system so that it can be positioned at any point along the track. A model rotator is mounted to the platform. A lower suspension system is provided that comprises a plurality of cables attached by one end to the rotator and attachable at the opposite end to various points on the lower surface of the model.

8 Claims, 5 Drawing Sheets

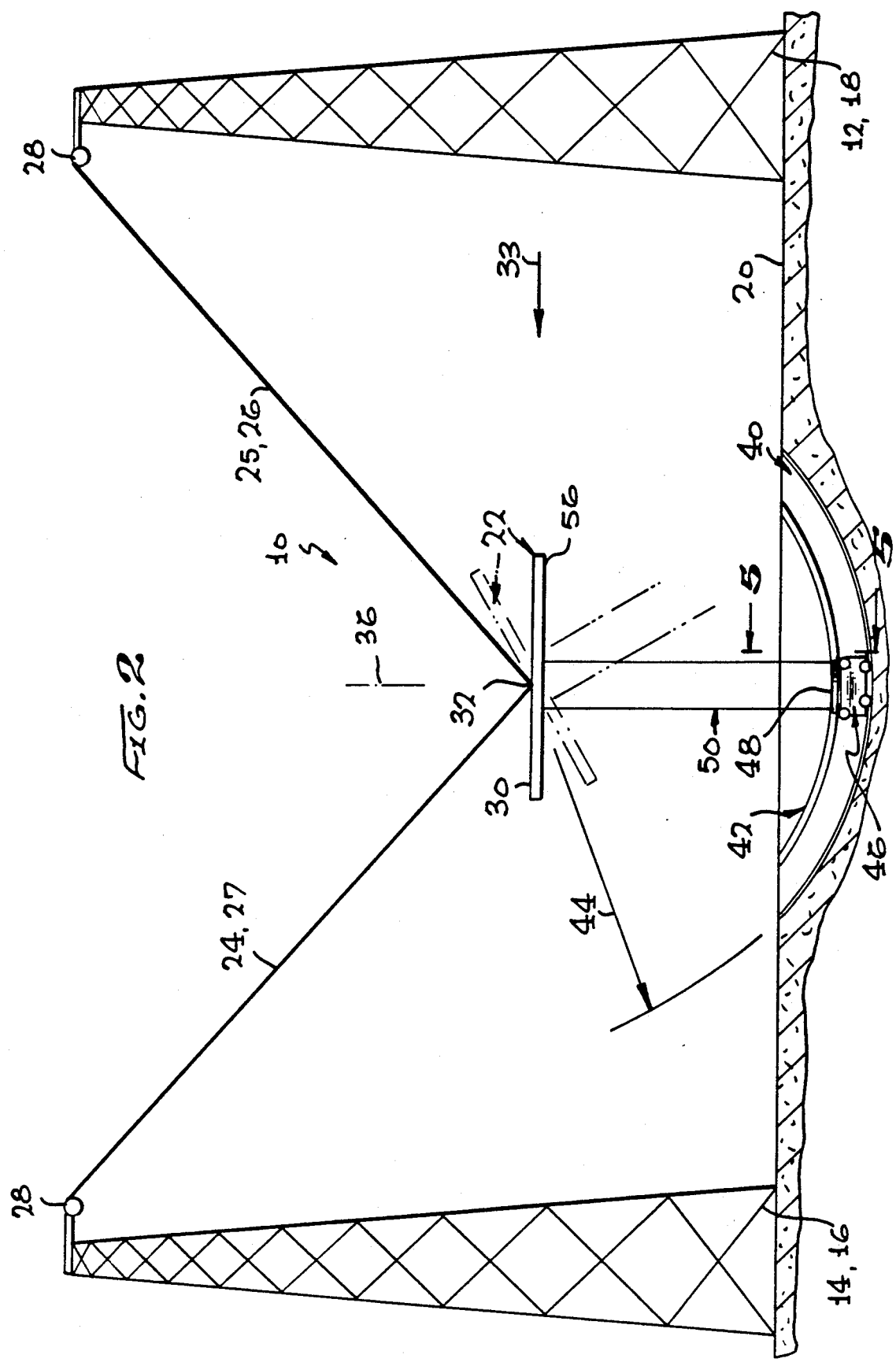

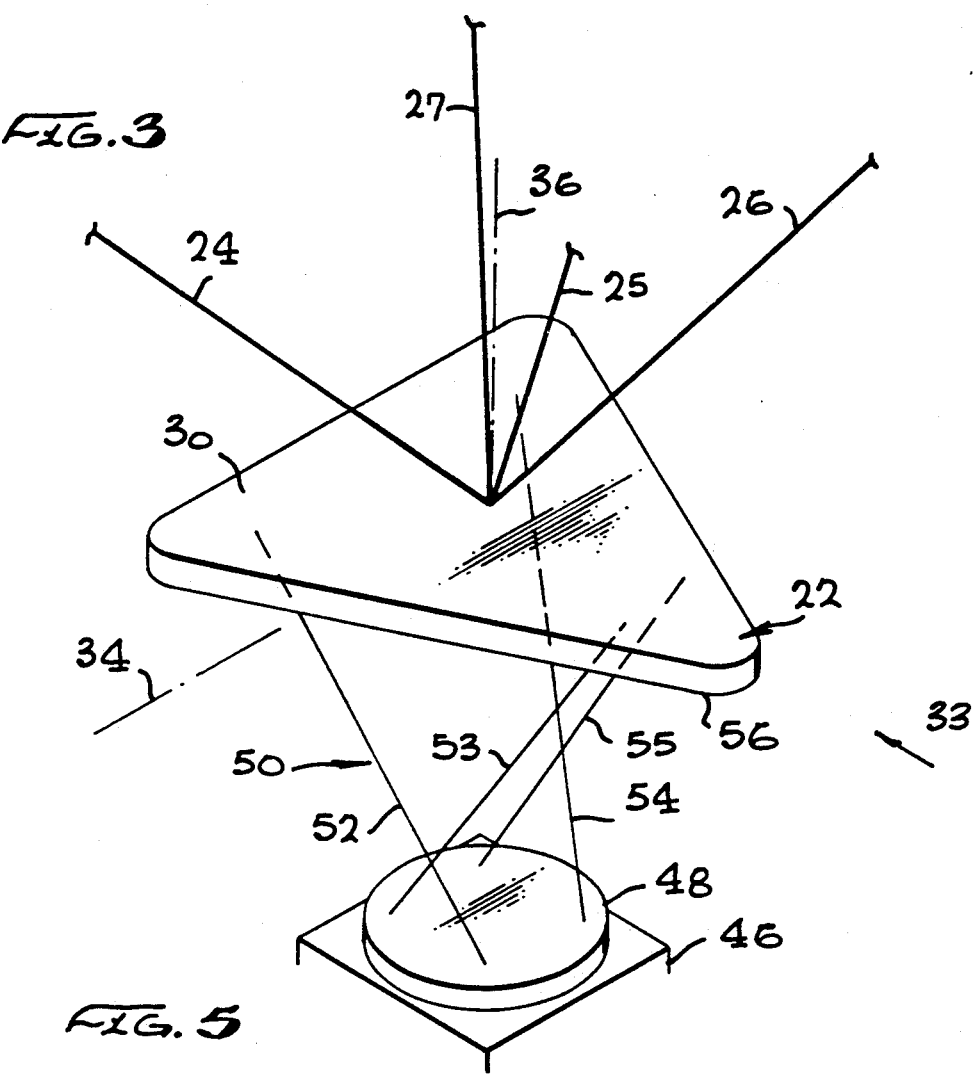
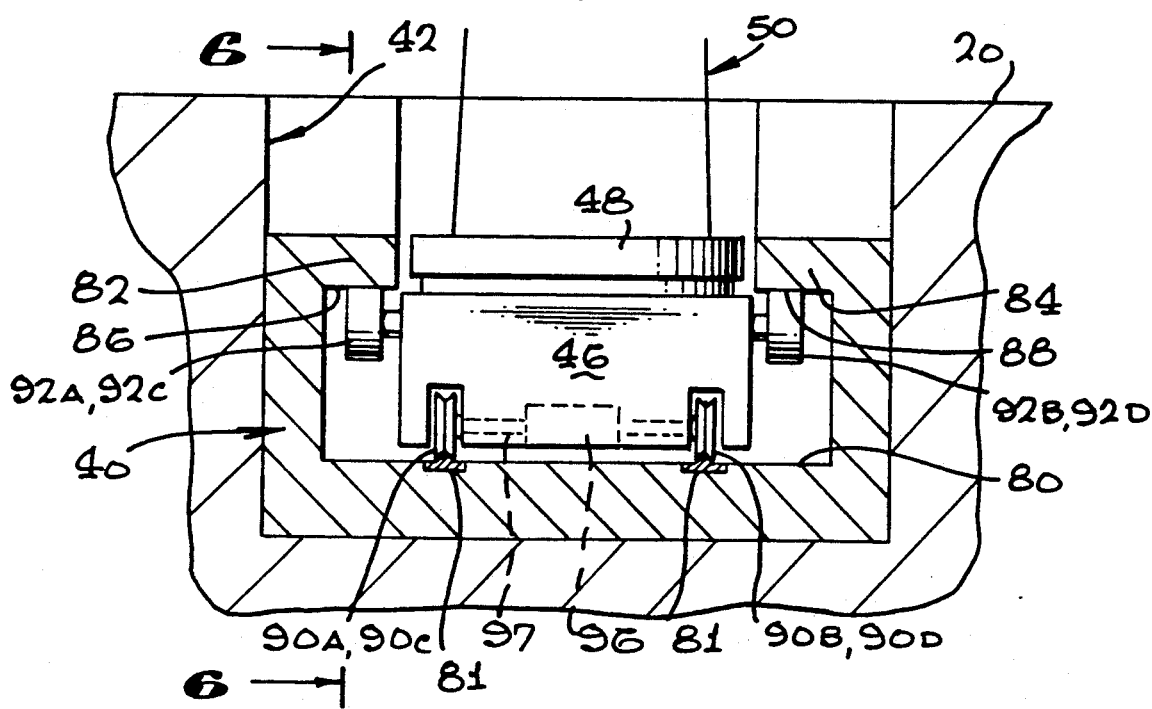

RADAR CROSS-SECTION MODEL SUPPORT AND POSITIONING APPARATUS

BACKGROUND OF THE INVENTION

1. Field of the Invention

The invention relates to the field of radar cross-section testing of models and, in particular, to support apparatus for the models.

2. Description of Related Art

The typical method of supporting a radar cross-section (RCS) test article, such as a model of an aircraft on a radar test range, is to mount it on a support pylon. The design of radar test ranges is discussed in U.S. Pat. No. 4,947,175, "Radar Range" by D. D. Overholser. If the model is very small and light in weight, the pylon can be made of low dielectric foam material. Such foam pylons are disclosed in U.S. Pat. Application Ser. No. 07/562,877, "Support Pylon For Radar Cross-Section Model Testing" by C. J. Larson (common assignee). If the model is large, the pylon is usually made of metal or high strength composite material having a low RCS shape. Additionally, the pylon is coated with radar absorbing materials. A rotator mechanism is mounted on top of the pylon and is coupled to the model so that it can be rotated about both the pitch and yaw axis. However, the size of the pylon and rotator increases proportionally with the size of the model and for certain radar frequencies, the pylon significantly interferes with the test results.

This has led to the use of cable suspension systems for the support of the models. In detail, such systems usually consist of a series of support columns with the model suspended by a set of upper cables there between. Additionally, the model is attached by a set of lower cables to a ground mounted rotator located vertically below it. By crossing two or more of these lower support cables, rotational force is applied to the model when the rotator is activated (rotated). However, when attempts are made to rotate a model already set at a specific pitch angle, the pitch angle will change as the azimuth changes. This requires that the length of these "vertical" support wires be adjusted as the model is rotated. Difficulty is encountered when attempting to continuously change the length of individual cables as the model is rotated. Also, such cable adjusting systems are expensive.

Therefore, it is a primary object of the invention to provide a RCS model support system for testing the model at a radar test range.

It is another primary object of the subject invention to provide a RCS model suspension type support system for testing the model at a radar test range.

It is a further object of the subject invention to provide a RCS model suspension type support system for testing the model at a radar test range, with the support system having an inexpensive system for maintaining proper pitch angle of the model as the model is rotated in the azimuth plane.

It is a further object of the subject invention to provide a RCS model suspension type support system for testing the model at a radar test range, with the support system having a simple and accurate system for maintaining the proper pitch angle of the model as the model is rotated in the azimuth plane.

SUMMARY OF THE INVENTION

The invention is an apparatus for supporting a model above a ground plane for illumination by a radar signal in order to determine the RCS thereof. In detail, the apparatus includes a plurality of support towers in a spaced relationship extending vertically upward from the ground plane. Typically, there are four columns in a square pattern. An upper suspension system is provided that comprises a separate cable attached at one end to one of the towers and is detachably attachable at the opposite end to the model at a single point on the upper surface thereof. Thus, the model can be simultaneously rotated azimuth plane (a plane perpendicular to the yaw axis) and vertically about the pitch axis (nose up or down). It is important that the cables be made of a low dielectric material such as DuPont Corporation's KEVLAR Brand armide fiber in order to reduce the RCS of the upper suspension system to a minimum so that it does not interfere with the measurements of the model.

A circular shaped track structure, aligned with the direction of the radar signal, is mounted below the ground plane having a center of the radius at the point that the cables of the upper suspension system attach to the model. A platform is movably mounted on the track structure and thus, moveable in a circular motion about the point that the cables attach to the model. The platform incorporates drive means so that it can be positioned at any point along the track. A model rotator is mounted to the platform. A lower suspension system is provided that comprises a plurality of cables attached by one end to the rotator and detachably attachable at the opposite end to various points on the lower surface of the model. These cables are also made of a low dielectric material.

Preferably, the track structure comprises a lower bed having guide rails mounted thereon, as well as overhanging side rails. The platform incorporates a plurality of lower wheels so that it can ride on the guide rails, as well as a plurality of spring biased upper wheels such that it can also ride against the underside of the overhanging side rails. This will allow the individual cables of the lower suspension system to be placed in tension without tending to lift the platform off the bed of the track. Of course, the platform, if it has sufficient weight, will insure that it will not lift off the guide rails.

It can be seen that the pitch of the model is controlled by movement of the platform and azimuth setting is independently controlled by the rotator. Thus, the problem of the prior art suspension system of a change in azimuth effecting the pitch is eliminated. Furthermore, it is a simpler system and much easier to control than the method wherein the lengths of the cables of the lower suspension system are changed as the model is rotated.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 2 is a side view of the apparatus illustrated in FIG. 1 taken along the arrow 2.

FIG. 3 is a simplified perspective view of the generic type model and rotator illustrating one embodiment of the lower cable suspension system.

FIG. 5 is a partial cross-sectional view of FIG. 2 taken along the line 5—5 in FIG. 2 particularly illustrating the track structure and moveable platform.

DESCRIPTION OF THE PREFERRED EMBODIMENT

Figure 1:
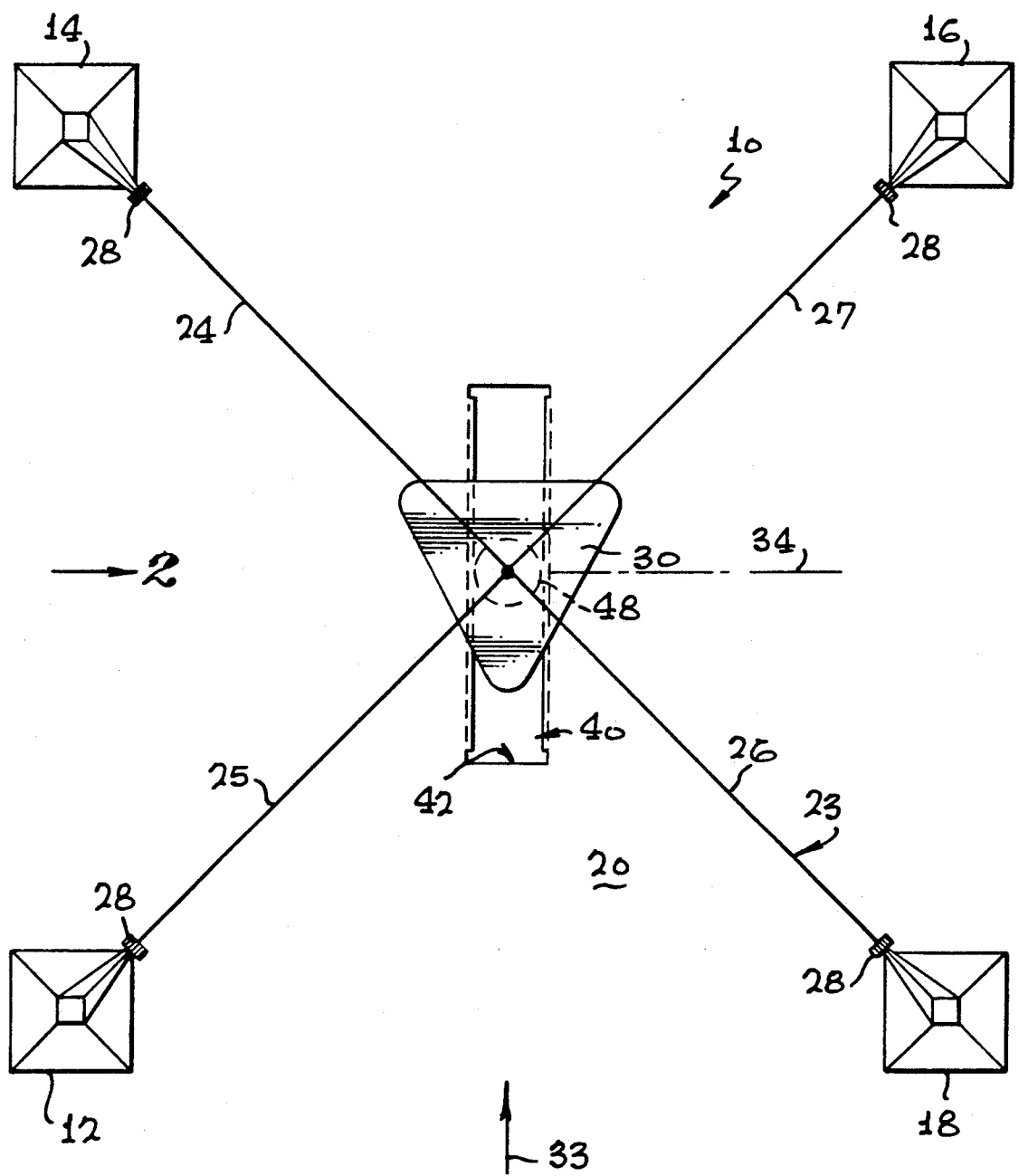
FIG. 1 is a top view of the apparatus with a generic type model installed therein.

Referring initially to FIGS. 1 and 2, it can be seen that the apparatus, generally indicated by numeral 10, includes 4 towers 12, 14, 16 and 18 mounted on and extending upward from a ground plane 20. A generic model of an aircraft 22 is suspended between the towers 12-18 by means of an upper cable suspension system 23 that includes 4 cables 24, 25, 26 and 27 attached at one end by means of a winch 28 to the top of the towers and detachably attached to the upper surface 30 of the model 22 at a single suspension point 32. The direction of the incoming radar signal from the radar (not shown) is indicated by arrow 33. The model 22, when attached thereto, can be simultaneously pivoted vertically about the pitch axis 34 and yaw axis 36 (azimuth change). Note that more than 4 towers could be used; however, it is most unlikely that it would ever be necessary. Two towers could be used but would most likely require horizontal arms for attachment of the cables in order to still provide 4 point suspension.

Still referring to FIGS. 1 and 2 and additionally to FIGS. 3-5, it can be seen that a circular shaped track structure 40 is positioned below the ground plane 20 in a rectangular trench 42. The track structure 40 is aligned with the direction of the incoming radar signal (arrow 33) and has a radius of curvature 44 with a center located at the suspension point 32 of the model 22. A platform 46 is movably mounted on the track structure 40 in a manner to be subsequently discussed. A model rotator 48 is mounted on the platform 46. Typically, a rotator is a device that supports a model on top of a pylon for RCS testing and is capable of rotating a model about both the pitch and yaw axis. However, in this application, it need only have the capability to rotate in the azimuth plane. A lower cable suspension system 50 is used to attach the rotator 48 to the model 22. Particularly, referring to FIG. 3, it can be seen that the lower cable suspension system 50 includes 4 cables 52, 53, 54 and 55 attached at one end to the rotator 48 at 4 points forming a square pattern. The opposite ends of the 4 cables 52-55 are detachably attached to the bottom surface 56 of the model 22 in a similar 4 point, rectangular pattern, except that cables 52 and 53 are crossed as well as cables 54 and 55. Having the cables cross each other in the above manner allows the rotator to rotate the model 22 about the yaw axis 36, particularly if the cables 52-55 are kept in tension in a manner to be subsequently discussed.

Figure 4:
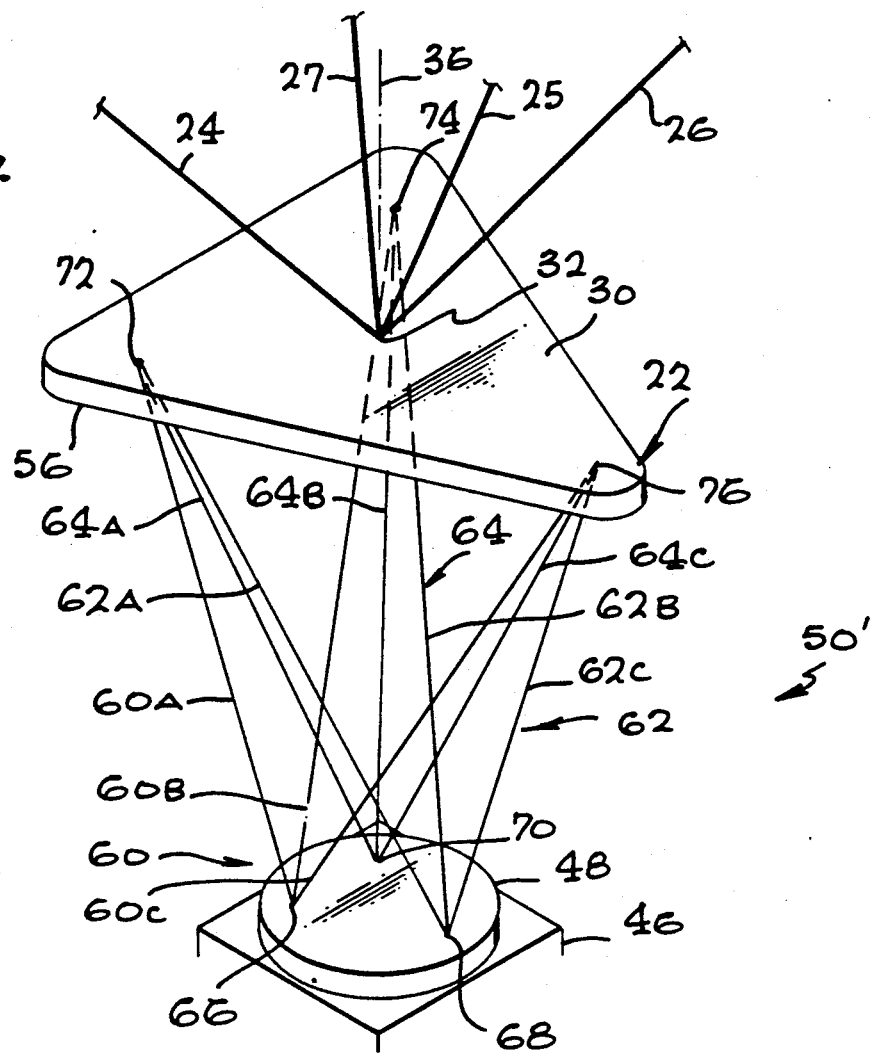
FIG. 4 is a simplified perspective view of the generic model illustrating a second embodiment of the lower cable suspension system.
Figure 6:
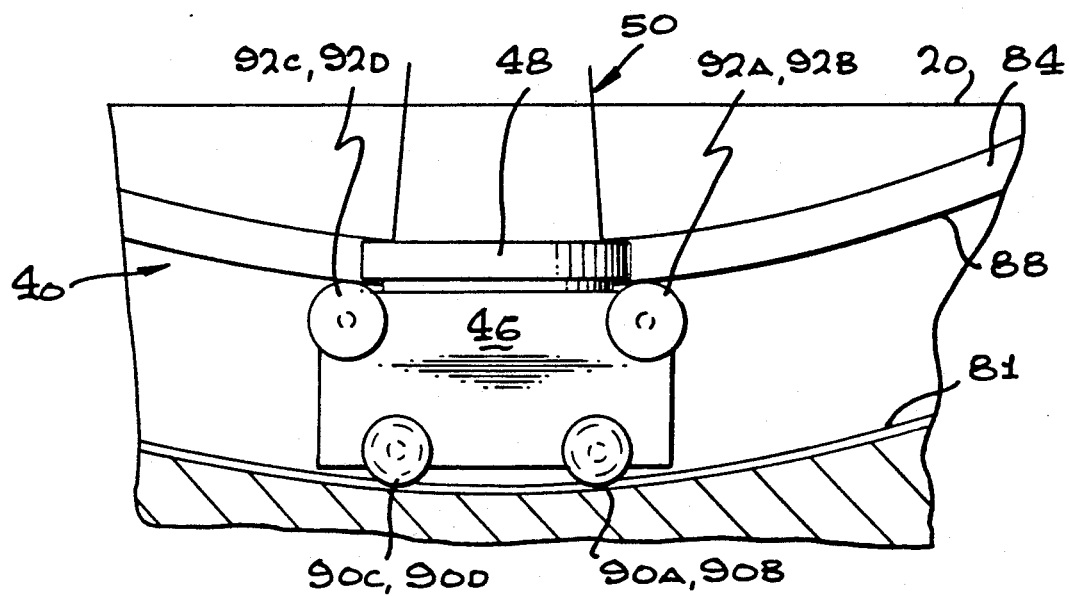
FIG. 6 is a cross-sectional view of the track structure and moveable platform shown in FIG. 5 taken along the line 6—6.

In FIG. 4 is a second embodiment of the lower cable suspension system, indicated by numeral 50'. The lower cable suspension system 50' includes three sets of cables 60, 62, and 64, each having three cables 60A, 60B, 60C; 62A, 62B, 62C; and 64A, 64B, 64C, respectively. Each set of cables 60, 62 and 64 are attached at one end to three separate points 66, 68 and 70, respectively on the rotator in a triangular pattern. The opposite ends of each of the cables are detachably attached at three separate points 72, 74 and 76 on the bottom surface 56 of the model 22 in a triangular pattern with one cable from each set detachably attached at each of the points. As illustrated in FIG. 4, cables 60A, 62A and 64A are attached at point 72, cables 60B, 62B and 64B are attached at point 74 and cables 60C, 62C and 64C are attached at point 76. This lower cable suspension system will provide even greater positioning control of the model 22. Of course, there are numerous other configurations that will provide more or less positioning control. It is also desirable that the lower suspension system cables be made of a dielectric material. Referring now to FIGS. 2, 5 and 6, it can seen that the track structure 40 includes a bed 80 with parallel tracks 81 mounted thereon. Further included are overhanging side rails 82 and 84 on either side of the bed 80 having underside surfaces 86 and 88, respectively. The platform 46 includes a plurality of lower wheels 90A, 90B, 90C and 90D mounted on the tracks 81. A plurality of upper wheels 92A, 92B, 92C, and 92D are also mounted on the platform and spring biased into contact with the underside surfaces 86 and 88 of the side rails 82 and 84, respectively. A motor 96 is mounted on the platform 46 and is operatively connected to at least one of the lower wheels and as illustrated, wheels 90A and 90B, by means of a drive shaft 97, thus, allowing the platform 46 to move along the tracks 81. With the cables of the lower cable suspension system 50 drawn tight, the upper spring biased wheels 92A-92D maintain these cables in tension. A brake system (not shown) is incorporated into the lower wheels 90A-90D to lock the platform into the desired position along the track structure 40.

Figure 7:
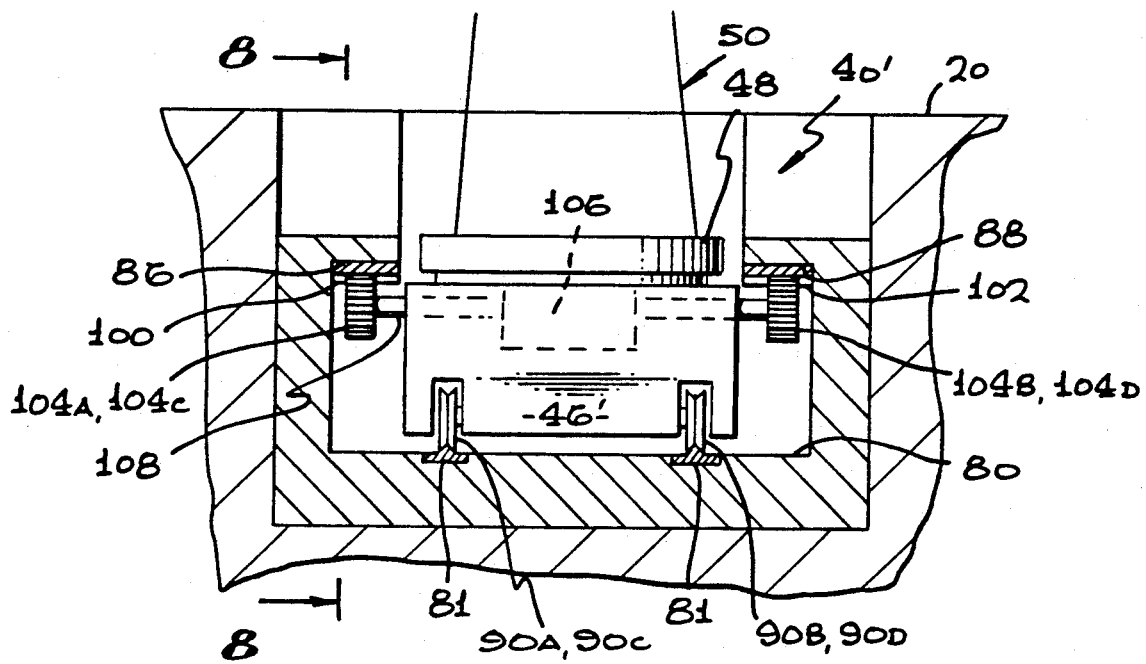
FIG. 7 is a side view similar to FIG. 5 illustrating a second version of the track structure and moveable platform.
Figure 8:
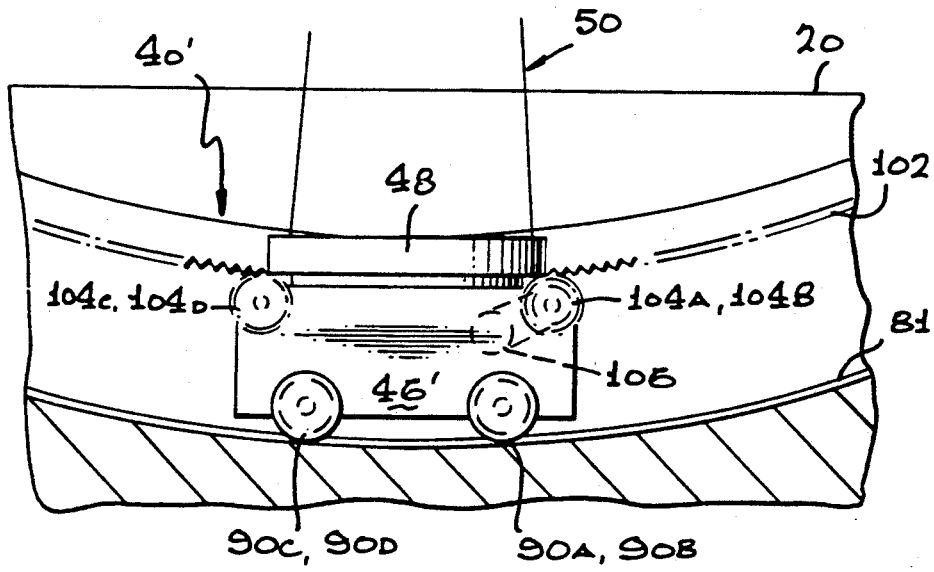
FIG. 8 is a cross-sectional view of the track structure and moveable platform shown in FIG. 7 taken along the line 8—8.

FIGS. 7 and 8 illustrate an alternate design of the track structure 40, indicated by 40' and platform, indicated by numeral 46'. The track structure 40' is essentially identical to the track structure 40, except that the underside surfaces 86 and 88 incorporate rack curved gears 100 and 102, respectively. The platform 46' is somewhat similar to the platform 46. However, pinon gears 104A and 104B are mounted to the platform 46' and engage the rack gear 100 and pinon gears 104C and 104D, also mounted to the platform 46' and engage the rack gear 102. A motor 106 drives the pinon gears 104A and 104D via drive shaft 108.

It can be seen that the apparatus can independently set the azimuth (rotation about the yaw axis) and pitch of the model without requiring any adjustment of the lower suspension system. Thus, the control system for controlling the pitch angle will be far less sophisticated than the prior art suspension systems which must be coupled to the rotator control system in order to achieve the required simultaneous pitch and azimuth changes.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has application to the aircraft industry, particularly those manufacturers of military aircraft.

I claim:

1. An apparatus for supporting a model above a ground plane for illumination by a radar signal to determine the radar cross-section thereof, the apparatus comprising:
    a plurality of support towers;
    an upper cable suspension means comprising a cable attached at one end to each one of said plurality of towers and its opposite end attachable to the top surface of the model at a single point such that the model is pivotally attachable to said opposite ends of said cables at said point;
    a circular shaped track aligned with the direction of the radar signal mounted below the ground plane, said track having a radius with said point as the center;
    a platform movably mounted on said track;
    a model rotator mounted on said platform; and
    a lower cable suspension means having one end attached to said rotator and an opposite end attachable to various points on the lower surface of the model, such that rotation of said rotator will cause rotation of the model.

2. The apparatus as set forth in claim 1 including drive means to move and reposition said platform on said track.

3. The apparatus as set forth in claim 2 comprising said upper and lower cable suspension means is made of a dielectric material.

4. The apparatus as set forth in claim 3 wherein said one end of said cables of said upper cable suspension system are attached to said towers by means of a winch.

5. The apparatus as set forth in claim 4 comprising:
    said track includes a bed having guide rails thereon and overhanging side rails on either side of said bed;
    a plurality of lower wheels mounted on said platform in contact with said bed of said track;
    a plurality of upper wheels mounted on said platform spring biased into contact with the underside of said guide rails; and
    said drive means includes a motor coupled to at least one of said lower wheels.

6. The apparatus as set forth in claim 4 comprising:
    said track includes a bed and overhanging side rails on either side of said bed, the underside of said overhanging side rails including a rack gear;
    a plurality of lower wheels mounted on said platform in contact with said guide rails of said track;
    a plurality of pinon gears mounted on said platform, said pinon gears spring biased into contact with said rack gears; and
    said drive means includes a motor coupled to at least one of said pinon gears.

7. The apparatus as set forth in claim 4 or 5 or 6 wherein said lower suspension means comprises four cables attached at one end to said rotator and attachable at said opposite end to the model in a square pattern with said cables crossed in a manner to form two pairs of crossed cables.

8. The apparatus as set forth in claim 4 or 5 or 6 wherein said lower suspension means comprises three sets of cables having three cables each, each set of cables attached at one end to three separate points on said rotator in a triangular pattern and attachable at the opposite ends of said cables to three separate points on the model in a triangular pattern with one cable from each set attachable at each of said points on said model.

* * * * *